(12) United States Patent
Ikeda et al.

(10) Patent No.: US 6,737,480 B2
(45) Date of Patent: May 18, 2004

(54) LOW-CONTAMINATIVE HOSE AND RUBBER COMPOSITION FOR USE IN MAKING THE SAME

(75) Inventors: Hidehito Ikeda, Kasugai (JP); Ayumu Ikemoto, Komaki (JP); Yoshio Okado, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/233,543

(22) Filed: Sep. 4, 2002

(65) Prior Publication Data

US 2003/0050405 A1 Mar. 13, 2003

(30) Foreign Application Priority Data

Sep. 4, 2001 (JP) ........................................ 2001-267702

(51) Int. Cl.[7] .............................................. C08C 19/20
(52) U.S. Cl. .................... 525/345; 525/331.7; 525/387; 524/445; 524/525; 526/335; 138/126; 428/36.8
(58) Field of Search ................................ 524/445, 525; 525/331.7, 387, 345; 526/335; 138/126; 428/36.8

(56) References Cited

U.S. PATENT DOCUMENTS

| | | | | |
|---|---|---|---|---|
| 4,714,733 A | * | 12/1987 | Itoh et al. ................... 524/493 |
| 5,179,156 A | * | 1/1993 | Takao et al. ................. 524/518 |
| 5,225,504 A | * | 7/1993 | Tatsu et al. .................. 526/206 |
| 5,733,983 A | * | 3/1998 | Hakuta et al. ............... 525/343 |
| 5,922,823 A | * | 7/1999 | Sagane et al. ............... 526/336 |
| 6,071,582 A | | 6/2000 | Tangiku et al. .......... 428/36.91 |

FOREIGN PATENT DOCUMENTS

| JP | 56-098249 | 8/1981 |
|---|---|---|
| JP | 06-262728 | 9/1994 |

OTHER PUBLICATIONS

European Search Report dated May 13, 2003.

* cited by examiner

*Primary Examiner*—David W. Wu
*Assistant Examiner*—Henry S. Hu
(74) *Attorney, Agent, or Firm*—Armstrong, Kratz, Quintos, Hanson & Brooks, LLP

(57) ABSTRACT

A low-contaminative hose which permits a fluid to be passed through with minimized fluid contamination, and a rubber composition used to produce such a hose. The low-contaminative hose is formed from the rubber composition that includes, as essential components, at least one rubber selected from an ethylene-propylene-diene terpolymer, an ethylene-propylene copolymer and a silicone rubber, a peroxide vulcanizing agent, and a filler having a laminar crystal structure.

9 Claims, No Drawings

LOW-CONTAMINATIVE HOSE AND RUBBER COMPOSITION FOR USE IN MAKING THE SAME

BACKGROUND OF THE INVENTION

The present invention relates to a low-contaminative hose that permits a fluid to be passed therethrough with an absolutely minimal level of fluid contamination, and further to a rubber composition for use in producing such a hose.

DESCRIPTION OF THE ART

Due to the problems with environmental pollution, the exhaustion of petroleum resources and the like, an impetus has been gathered in recent years to develop fuel cell-powered vehicles. A fuel cell is designed to receive, via supply pipes, a fuel gas typified by hydrogen or methanol, source of oxygen typified by air, and a cooling liquid typified by water or glycol. Thus, in the fuel cell, hydrogen component of the above fuel gas is allowed to react with oxygen component of the above air, thereby generating electrical energy. Unreacted components of the above fuel gas and unreacted air are released from the fuel cell through their respective exhaust pipes and then put back into their respective supply pipes. The above cooling liquid, which is being circulated in the fuel cell, is released through its exhaust pipe, followed by cooling and returns to its supply pipe.

A single cell in the fuel cell is generally structured with electrodes fitted thereto, which electrodes are formed by coating a catalyst such as platinum or the like on both sides of a plate-like electrolyte. The two electrodes are further connected to externally disposed electrical conductors. Electricity generation is performed with the fuel gas supplied to one such electrode, i.e., a negative pole, and with the air supplied to the other, i.e., a positive pole. More specifically, the fuel gas is decomposed by the action of the catalyst into hydrogen ions, i.e., protons, and electrons at the negative pole so that the hydrogen ions migrate to the positive pole after passage through the above-mentioned electrolyte, and the electrons migrate to the positive pole after passage through the above-mentioned external conductors. At the positive pole, the oxygen gas contained in the air is catalytically reacted with the hydrogen ions and electrons that have been migrated to that pole as stated above, whereby water is produced. Such a single cell structure acts as a fuel cell because an electric current flows upon migration of the above electrons.

However, in situations where ion extraction occurs from transport pipelines including the above supply pipes, exhaust pipes and the like, fluids such as a fuel gas and the like passing through the pipelines become mixed with and contaminated by the extracted ions. This causes contamination of the electrolyte, catalyst and the like in the above-described fuel cell, thus causing failure in the proper migration of hydrogen ions, decomposition of fuel gas and production of water during electricity generation. The fuel cell, therefore, suffers from poor efficiency in electricity generation and a considerable decline in output.

As another serious problem resulting from the ion extraction from each transport pipe, the fluid itself running through the pipeline becomes easily electrically conductive, and therefore, the fuel cell is liable to produce electrical leakage outwardly through the fluid. This electrical leakage is responsible for inefficient electricity generation in the fuel cell and also for generating hazardous electrical shocks to human beings.

Similar consequences occur, in addition to the transport pipes used in a fuel cell, in transport pipes for cooling liquids used in super computers, as well as in transport pipes for membrane cleaning liquids used in analytical instruments, and in the transport pipes for chip or wafer cleaning liquids used in semiconductor production. Namely, in the case of ion extraction arising from a cooling liquid-transport pipe used in such a super computer, the cooling liquid flowing through that pipe tends to become easily electrically conductive due to the extracted ions. Thus, the super computer is likely to produce outward electrical leakage, or produce improper operating signals. Furthermore, in the case of ion extraction arising from a membrane cleaning liquid-transport pipe used in such an analytical instrument, the membrane tends to be contaminated by the extracted ions, thus failing to ensure accurate analysis. And furthermore, in the case of ion extraction arising from a chip cleaning liquid-transport pipe used in semiconductor production, the semiconductor chips tend to be contaminated by the extracted ions, thereby frequently producing defective chips.

From the standpoint of good assembly working, it has been demanded that each such transport pipes be formed from a flexible material, that is, a hose.

SUMMARY OF THE INVENTION

The present inventors have made intensive studies in order to prevent a fluid running through a hose from being contaminated by the hose itself. In the studies, an approach has been centered on using at least one rubber selected from among an ethylene-propylene-diene terpolymer, an ethylene-propylene copolymer and a silicone rubber, and it has been found that when one such rubber is vulcanized using a peroxide as a vulcanizing agent, the use of a vulcanization accelerator such as a metal oxide or a metal hydroxide can be omitted, which accelerator is required for a rubber to be sulfur-vulcanized, and that the resultant hose is less likely to extract ions, which are eventually mixed in the fluid being passed through the hose. From further studies, it has also been found that when the above-noted rubber is subjected to peroxide vulcanization in the presence of a filler having a laminar crystal structure, a hose is formed which can more reliably alleviate ion extraction with respect to a fluid passing through the hose. These findings have led to the present invention. Here, the reason why such a filler with a laminar crystal structure is effective in making the hose much more resistant to ion extraction would presumably be attributable to the fact that the ions, even if extracted, are brought into an entrapped condition between the layers arranged to constitute the above-mentioned laminar crystal structure.

Accordingly, one object of the present invention is to provide a low-contaminative hose that permits a fluid to be passed therethrough at an absolutely minimal level of fluid contamination. Another object of the invention is to provide a rubber composition used in producing such a hose.

According to one aspect of the subject invention, a low-contaminative hose is provided which includes as essential components (A) at least one rubber selected from the group consisting of an ethylene-propylene-diene terpolymer, an ethylene-propylene copolymer and a silicone rubber;

(B) a peroxide vulcanizing agent; and (C) a filler having a laminar crystal structure.

According to another aspect of the present invention, a rubber composition for use in producing such a low-contaminative hose is provided which includes as essential components, (A) at least one rubber selected from the group consisting of an ethylene-propylene-diene terpolymer, an ethylene-propylene copolymer and a silicone rubber;

(B) a peroxide vulcanizing agent; and (C) a filler having a laminar crystal structure.

DESCRIPTION OF THE PREFERRED EMBODIMENTS

The present invention will now be described in greater detail and with regard to preferred embodiments.

One embodiment of the low-contaminative hose according to the invention can be achieved using a specific rubber composition. This rubber composition includes, as essential components, a selected rubber (component A), a peroxide vulcanizing agent (component B) and a filler having a laminar crystal structure (component C).

The selected rubber (component A) is chosen from an ethylene-propylene-diene terpolymer (hereinafter denoted by "EPDM"), an ethylene-propylene copolymer (hereinafter denoted by "EPM") and a silicone rubber. These rubbers may be used singly, or two or three rubbers may be used in combination. EPDM is not specifically limited so long as it can be suitably used as a base material for the above-mentioned rubber composition. However, it is preferred that the EPDM have an iodine value of 6 to 30 and an ethylene content of 48 to 70% by weight. In particular, the iodine value more preferably is in the range of 10 to 24, while the ethylene content more preferably is in the range of 50 to 60% by weight.

No particular limitation is placed on the diene monomer, i.e., the third ingredient, for use in EPDM, but a diene monomer with 5 to 20 carbon atoms is preferred. Specific examples of the diene monomer include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, 2-isopropenyl-5-norbornene and the like. These diene monomers may be used singly, or two or more monomers may be used in combination. Of the diene monomers listed above, it is preferred that dicyclopentadiene (DCP) and 5-ethylidene-2-norbornene (ENB) be used alone or in combination.

The peroxide vulcanizing agent (component B), which is mixed with the selected rubber (component A), is chosen from, for example, 2,4-dichloro-benzoyl peroxide, benzoyl peroxide, 1,1-di-t-butylperoxy-3,3,5-trimethyl-cyclohexane, 2,5-dimethyl-2,5-dibenzoylperoxyhexane, n-butyl-4,4'-di-t-butylperoxy valerate, dicumyl peroxide, t-butylperoxy benzoate, di-t-butylperoxydiisopropylbenzene, t-butylcumyl peroxide, 2,5-dimethyl-2,5-di-t-butylperoxyhexane, 2,5-dimethyl-2,5-di-t-butylperoxyhexene-3 and the like. These peroxides may be used singly, or two or more peroxides may be used in combination. Of the peroxides listed above, di-t-butylperoxydiisopropylbenzene is particularly preferable as it is free of malodor.

The amount of the peroxide vulcanizing agent (component B) to be added preferably is in the range of 1 to 10 parts by weight and, more preferably, 3 to 7 parts by weight, based on 100 parts by weight of the selected rubber (component A). The unit, part or parts by weight, is hereinafter referred to as "part" or "parts" for the convenience of explanation. If component B is less than 1 part, sufficient vulcanization is not attained so that the resultant hose is conducive to poor sealing properties. Conversely, if component B is more than 10 parts, the hose tends to become too hard to achieve adequate hose functions because it has too low an elongation at break, or too high a compression set.

The filler (component C), which is mixed with component A and component B, should be of a laminar crystal structure. The filler includes, for example, clay, talc, kaolinite, hydrotalcite, mica and the like. These fillers may be used singly, or two or more fillers may be used in combination. In view of its mechanical properties and molding properties, component C preferably has a mean particle diameter of 0.05 to 20 $\mu$m and, more preferably, 0.1 to 10 $\mu$m.

The amount of the filler (component C) to be added preferably is in the range of 20 to 130 parts and, more preferably, 40 to 110 parts, based on 100 parts of the selected rubber (component A). If component C is less than 20 parts, the resultant hose has a low electrical resistance, potentially causing electric leakage when it is used in a system where an electric current must be distributed, such as a fuel cell, a super computer or the like. Conversely, if component C is more than 130 parts, the hose tends to suffer poor resistance to ion extraction relative to a fluid placed in contact with that hose so that the fluid becomes easily contaminated with the extracted ions.

To the specific rubber composition according to the present invention, other components may be added, where desired, which include carbon black, paraffinic softeners and the like.

The specific rubber composition can be prepared by mixing components A to C with each other and, when necessary, with other components, and then by kneading the mixture using a kneading machine such as a roll, a kneader, a Banbury mixer or the like.

The low-contaminative hose according to the present invention can be formed, though not limited but for example, by extrusion-molding the above-described specific rubber composition using a mandrel, and thereafter by vulcanizing the whole extrudate, followed by drawing of the mandrel.

The low-contaminative hose thus formed typically has a thickness of about 1.5 to 12 mm depending on the uses of that hose. The inner diameter of this low-contaminative hose varies with the particular use, but usually ranges from about 5 to 50 mm.

The low-contaminative hose of the invention is structured such that a fluid to be passed therethrough is prevented from being contaminated by the ions extracted from that hose. Even in the case of using the hose as a transport pipeline for a fuel cell, the low-contaminative hose can therefore help minimize any possible reductions in electricity generation efficiency and in output of the fuel cell as well as any possible electric leakage. Furthermore, in the case of using the hose as a cooling liquid-transport pipe in a super computer, as a membrane cleaning liquid-transport pipe in an analytical instrument, and as a chip or wafer cleaning liquid-transport pipe in semiconductor production, the low-contaminative hose can eliminate the problems encountered in the conventional art as discussed earlier.

The low-contaminative hose of the present invention is not limited to the uses of the above-mentioned transport pipes. This hose can also be suitably applied to engine cooling hoses for various vehicles, such as a radiator hose used to connect an engine and a radiator, a heater hose used to connect an engine and a heater core, and other like hoses.

In particular, with regard to a low-contaminative hose that is formed by mixing the selected rubber (component A), the peroxide vulcanizing agent (component B), and the laminar crystal structure-having filler (component C) within the above-specified ranges of components, i.e., within 1 to 10 parts of component B and 20 to 130 parts of component C, respectively, per 100 parts of component A, such a hose can be extracted using pure water as a solvent such that the solvent reveals an electrical conductivity of 20 µS/cm or less. Thus, even when a fluid is allowed to run through the low-contaminative hose, the fluid in itself is less electrically conductive. Therefore, the low-contaminative hose in accordance with such specified mixing ranges can yield excellent performance when it is used in a system where an electric current must be distributed, such as a transport pipe for the above fuel cell, or a cooling liquid-transport pipe for a super computer.

Furthermore, the low-contaminative hose in accordance with such specified mixing ranges met can be extracted in the same manner as stated above such that the solvent has a metal ion concentration of 0.5 ppm or less. Thus, even when a fluid is allowed to run through the low-contaminative hose, the fluid is less likely to be contaminated by the metal ions. In this respect, the low-contaminative hose formed within such specified mixing ranges can yield excellent performance when it is used as a transport pipe for the above fuel cell, a cooling liquid-transport pipe for a super computer, a membrane cleaning liquid-transport pipe for an analytical instrument, and a chip or wafer cleaning liquid-transport pipe for semiconductor production.

And further, the low-contaminative hose within such specified mixing ranges has, in itself, a volume resistivity of $10^7$ Ω·cm or more, a surface resistivity of $10^8$ Ω or more, and an alternating electrical resistance (impedance) of $10^4$ Ω·cm or more on flow of an alternating electric current of $10^4$ Hz. Therefore, the low-contaminative hose is sufficiently high in electrical resistance. The low-contaminative hose within such specified mixing ranges, therefore, causes almost no electrical leakage even when it is used in a system where an electric current must be distributed, such as a transport pipe for the above fuel cell, or a cooling liquid-transport pipe for a super computer. Hence, this low-contaminative hose can yield excellent performance when in use as a transport pipe for a system that needs the distribution of an electric current.

In the foregoing embodiment, the specific rubber composition according to the invention has been formed into a low-contaminative hose in a tubular shape. Shapes of a sheet, a circle, a rod and the like are also acceptable which are capable of producing the same functions and effects as in this embodiment.

The following examples are given to further illustrate the present invention.

EXAMPLE 1

Rubber Composition

A rubber composition was prepared by mixing 100 parts of EPDM (Esprene 532 produced by Sumitomo Chemical Co., Ltd.) as a selected rubber (component A), 4.2 parts of Perbutyl P-40 (produced by NOF Corporation) as a peroxide vulcanizing agent (component B), and 15 parts (which was smaller than the lower limit of the above-specified mixing amount) of talc (Mistlon Vapor Talc produced by Nippon Mistlon Co., Ltd.) as a filler having a laminar crystal structure, and as other components, 100 parts of carbon black (Asahi No. 52 produced by Asahi Carbon Co., Ltd.) and 60 parts of a paraffinic softener (Diana Process PW-380 produced by Idemitsu Co., Ltd.), and then by kneading the mixture by a Banbury mixer and a roll.

Rubber Sheet

The rubber composition thus obtained was press-vulcanized at 160° C. for 45 minutes, whereby a rubber sheet of 2 mm in thickness was produced.

EXAMPLE 2

In the same manner as in Example 1 except that the amount of the filler (component C) was changed to 20 parts (which was equivalent to the lower limit of the above-specified mixing amount), a rubber composition was prepared from which a rubber sheet was then produced.

EXAMPLE 3

In the same manner as in Example 1 except that the amount of the filler (component C) was changed to 75 parts (which was an intermediate value of the above-specified mixing amount), a rubber composition was prepared from which a rubber sheet was then produced.

EXAMPLE 4

In the same manner as in Example 1 except that the amount of the filler (component C) was changed to 130 parts (which was equivalent to the upper limit of the above-specified mixing amount), a rubber composition was prepared from which a rubber sheet was produced.

EXAMPLE 5

In the same manner as in Example 1 except that the amount of the filler (component C) was changed to 135 parts (which was larger than the upper limit of the above-specified mixing amount), a rubber composition was prepared from which a rubber sheet was then produced.

EXAMPLE 6

In the same manner as in Example 1 except that the filler (component C) was replaced by calcined clay (Barges KE produced by Barges Pigments Co.), and the calcined clay was used in an amount of 75 parts (which was an intermediate value of the above-specified mixing amount), a rubber composition was prepared from which a rubber sheet was then produced.

EXAMPLE 7

In the same manner as in Example 1 except that the filler (component C) was replaced by kaolinite (Hardtop Clay-S produced by Shiraishi Calcium Co., Ltd.), and the kaolinite was used in an amount of 75 parts (which was an intermediate value of the above-specified mixing amount), a rubber composition was prepared from which a rubber sheet was then produced.

EXAMPLE 8

In the same manner as in Example 1 except that the filler (component C) was replaced by hydrotalcite (KW-2200 produced by Kyowa Chemical Co., Ltd.), and the hydrotalcite was used in an amount of 75 parts (which was an intermediate value of the above-specified mixing amount), a rubber composition was prepared from which a rubber sheet was then produced.

EXAMPLE 9

In the same manner as in Example 1 except that the filler (component C) was replaced by mica (Suzolight Mica produced by Marietta Co.), and the mica was used in an amount of 75 parts (which was an intermediate value of the above-specified mixing range), a rubber composition was prepared from which a rubber sheet was then produced.

EXAMPLE 10

In the same manner as in Example 3 except that 100 parts of EPM (Esprene 201 produced by Sumitomo Chemical Co., Ltd.) was used as the selected rubber (component A), a rubber composition was prepared from which a rubber sheet was then produced.

EXAMPLE 11

In the same manner as in Example 3 except that 100 parts of a silicone rubber (TSE 2571-7U produced by Toshiba Silicone Co., Ltd.) was used as the selected rubber (component A), a rubber composition was prepared from which a rubber sheet was then produced.

EXAMPLE 12

In the same manner as in Example 3 except that a combination of 50 parts of the above-noted EPDM and 50 parts of the above-noted EPM was used as the selected rubber (component A), a rubber composition was prepared from which a rubber sheet was then produced.

EXAMPLE 13

In the same manner as in Example 3 except that a combination of 50 parts of the above-noted EPDM and 50 parts of the above-noted silicone rubber was used as the selected rubber (component A), a rubber composition was prepared from which a rubber sheet was then produced.

EXAMPLE 14

In the same manner as in Example 3 except that a combination of 50 parts of the above-noted EPM and 50 parts of the above-noted silicone rubber was used as the selected rubber (component A), a rubber composition was prepared from which a rubber sheet was then produced.

EXAMPLE 15

In the same manner as in Example 3 except that a combination of 50 parts of the above-noted EPDM, 30 parts of the above-noted EPM and 20 parts of the above-noted silicone rubber was used as the selected rubber (component A), a rubber composition was prepared from which a rubber sheet was then produced.

COMPARATIVE EXAMPLE 1

In the same manner as in Example 3 except that 1 part of sulfur (Sulfur-PTC produced by Daito Industries Co., Ltd.) was used in place of the above-noted peroxide vulcanizing agent (component B), and 4 parts of accelerator TT (Sanceler-TT produced by Sanshin Chemical Co., Ltd.) was further added, a rubber composition was prepared from which a rubber sheet was then produced.

COMPARATIVE EXAMPLE 2

In the same manner as in Example 3 except that the above-noted filler (component C) was omitted, a rubber composition was prepared from which a rubber sheet was then produced.

COMPARATIVE EXAMPLE 3

As a rubber, 100 parts of NBR (JSR N 230S produced by JSR Corporation) was used instead of the above-noted selected rubber (component A). As a vulcanizing agent, a mixture of 1 part of the above sulfur, 2 parts of the above accelerator TT and 5 parts of zinc oxide (two kinds of zinc oxide produced by Mitsui Metal Mining Co., Ltd.) was used instead of the above-noted peroxide vulcanizing agent (component B). The use of the above-noted filler (component C) was omitted, whereas 60 parts of the above carbon black and 10 parts of a phthalate type softener (DOP produced by Mitsubishi Monsanto Vinyl Co., Ltd.) were added as other components. In the same manner as in Example 1 except for such changes, a rubber composition was prepared from which a rubber sheet was then produced.

COMPARATIVE EXAMPLE 4

As a rubber, 100 parts of CR (Neoprene W produced by Showa Denko K.K.) was used instead of the above-noted selected rubber (component A). As a vulcanizing agent, a mixture of 4 parts of magnesium oxide (Kyowa Mag No. 150 produced by Kyowa Chemical Co., Ltd.), 1 part of accelerator 22 (Sanceler 22 produced by Sanshin Chemical Co., Ltd.) and 5 parts of the above zinc oxide was used instead of the above-noted peroxide vulcanizing agent (component B). The use of the above-noted filler (component C) was omitted, whereas 60 parts of the above carbon black and 10 parts of the above phthalate type softener were added as other components. In the same manner as in Example 1 except for such changes, a rubber composition was prepared from which a rubber sheet was then produced.

COMPARATIVE EXAMPLE 5

As a rubber, 100 parts of CPE (Neoprene 401A produced by Showa Denko K.K.) was used instead of the above-noted selected rubber (component A). The above-noted peroxide vulcanizing agent (component B) was used in an amount of 5 parts and further mixed with 5 parts of an epoxy resin (Epicoat 828 produced by Yuka Shell Epoxy Co., Ltd.). The use of the above-noted filler (component C) was omitted, whereas 70 parts of the above carbon black and 20 parts of the above phthalate type softener were added as other components. In the same manner as in Example 1 except for such changes, a rubber composition was prepared from which a rubber sheet was then produced.

The characteristics of the rubber sheets obtained in the examples and comparative examples were measured in accordance with the following criteria. Overall evaluation was made from these measurements with the results shown in Table 1 to Table 4.

Dry Physical Properties (Properties after Vulcanization)

From each rubber sheet, a dumbbell specimen of No. 5 stipulated by JIS (Japanese Industrial Standards) was punched out and put to use in determining the tensile strength (TB), elongation (EB) and hardness (HA) according to JIS K 6251. Both the tensile strength (TB) and the elongation (EB) are better for the purposes of the present invention as their respective values are higher. Good values of the hardness (HA) for the purposes of the present invention are in the range of 60 to 75.

Electrical Resistance

From each rubber sheet, a circular specimen of 100 mm in diameter was punched out and put to use in determining the volume resistivity and surface resistivity according to JIS K 6911. The alternating electrical resistance (impedance) on flow of an alternating electric current of $10^4$ Hz was also determined according to JIS C 1102-6. The volume resistivity, surface resistivity and alternating electrical resistance (impedance) are better for the purposes of the present invention as their respective values are higher.

Electrical Conductivity

Each rubber sheet was first degreased with alcohol, weighed to 50 g and placed in a hermetic container made of Teflon. Then, 250 ml of pure water was poured into the container, and heat treatment was performed 100° C. for 168 hours, followed by cooling to room temperature (25° C.). In so doing, the rubber sheet was extracted using the pure water as a solvent. After the extraction was completed, the electrical conductivity of the solvent was measured on a conductivity meter. Lower values of electrical conductivity are better for the purposes of the present invention.

Metal Ion Concentration

Extraction was carried out in the same manner as in the preceding paragraph. The metal ion concentration in the solvent was measured by ICP emission spectroscopy. This concentration is better for the purposes of the present invention as its values are lower.

Overall Evaluation

Overall evaluation was made in the following way. The rubber compositions prepared in the examples and comparative examples were considered to have been produced into hoses, but not into rubber sheets, in light of the characteristics obtained with the above-mentioned rubber sheets. A hose judged excellent as a transport pipe for a fuel cell was denoted by a ○ symbol, a fuel cell judged less comparable to the first excellent hose but practically acceptable was denoted by a Δ symbol, and a hose judged bad was denoted by a × symbol. A hose found excellent as a transport pipe for a fuel cell and symbolized ○ meets all requirements including a volume resistivity of $10^7$ Ω·cm or more, a surface resistivity of $10^8$ Ω or more, an alternating electrical resistance (impedance) of $10^4$ Ω·cm or more as determined on flow of an alternating electric current of $10^4$ Hz, an electrical conductivity of a solvent of 20 μS/cm or less as determined in the above-described mode of extraction, and a metal ion concentration in a solvent of 0.5 ppm or less as determined in the above-described mode of extraction.

As is clear from the tabulated results, the low-contaminative hose formed from each of the rubber compositions of the examples according to the present invention is significantly useful as a transport pipe for a fuel cell, when compared to the comparative hoses prepared according to the comparative examples.

TABLE 1

| Mixing Amounts | | Examples | | | | |
|---|---|---|---|---|---|---|
| (part by weight) | | 1 | 2 | 3 | 4 | 5 |
| rubber | EPDM | 100 | 100 | 100 | 100 | 100 |
| | EPM | — | — | — | — | — |
| | silicone rubber | — | — | — | — | — |
| vulcanization | peroxide | 4.2 | 4.2 | 4.2 | 4.2 | 4.2 |
| filler | talc | 15 | 20 | 75 | 130 | 135 |
| carbon black | | 100 | 100 | 100 | 100 | 100 |
| paraffinic softener | | 60 | 60 | 60 | 60 | 60 |
| dry physical | TB (MPa) | 14.1 | 13.8 | 13.2 | 12.6 | 11.0 |
| property | EB (%) | 390 | 360 | 350 | 360 | 280 |
| | HA (point) | 65 | 66 | 70 | 74 | 73 |
| volume resistivity (Ω · cm) | | $8 \times 10^6$ | $2 \times 10^7$ | $4 \times 10^{11}$ | $2 \times 10^{12}$ | $4 \times 10^{12}$ |
| surface resistivity (Ω) | | $4 \times 10^8$ | $6 \times 10^8$ | $1 \times 10^{13}$ | $8 \times 10^{13}$ | $2 \times 10^{14}$ |
| alternating electrical resistance (Ω · cm) | | $3 \times 10^6$ | $1 \times 10^6$ | $9 \times 10^{10}$ | $7 \times 10^{11}$ | $9 \times 10^{11}$ |
| electrical conductivity (μS/cm) | | 10.5 | 11.8 | 14.8 | 19.7 | 20.2 |
| metal ion concentration (ppm) | | 0.25 | 0.27 | 0.35 | 0.48 | 0.60 |
| Overall Evaluation | | Δ | ○ | ○ | ○ | Δ |

TABLE 2

| Mixing Amounts | | Examples | | | |
|---|---|---|---|---|---|
| (part by weight) | | 6 | 7 | 8 | 9 |
| rubber | EPDM | 100 | 100 | 100 | 100 |
| | EPM | — | — | — | — |
| | silicone rubber | — | — | — | — |
| vulcanization | peroxide | 4.2 | 4.2 | 4.2 | 4.2 |
| filler | clay | 75 | — | — | — |
| | kaolinite | — | 75 | — | — |
| | hydrotalcite | — | — | 75 | — |
| | mica | — | — | — | 75 |
| carbon black | | 100 | 100 | 100 | 100 |
| paraffinic softener | | 60 | 60 | 60 | 60 |
| dry physical | TB (MPa) | 12.9 | 12.8 | 13.4 | 12.5 |

TABLE 2-continued

| Mixing Amounts | | Examples | | | |
|---|---|---|---|---|---|
| (part by weight) | | 6 | 7 | 8 | 9 |
| property | EB (%) | 370 | 420 | 380 | 430 |
| | HA (point) | 71 | 69 | 70 | 69 |
| volume resistivity ($\Omega \cdot$ cm) | | $5 \times 10^{11}$ | $2 \times 10^{11}$ | $7 \times 10^{11}$ | $8 \times 10^{10}$ |
| surface resistivity ($\Omega$) | | $3 \times 10^{13}$ | $9 \times 10^{12}$ | $6 \times 10^{13}$ | $6 \times 10^{12}$ |
| alternating electrical resistance ($\Omega \cdot$ cm) | | $1 \times 10^{11}$ | $6 \times 10^{10}$ | $4 \times 10^{11}$ | $3 \times 10^{10}$ |
| electrical conductivity ($\mu$S/cm) | | 13.2 | 14.4 | 15.2 | 18.3 |
| metal ion concentration (ppm) | | 0.32 | 0.34 | 0.37 | 0.43 |
| Overall Evaluation | | ○ | ○ | ○ | ○ |

TABLE 3

| Mixing Amounts | | Examples | | | | | |
|---|---|---|---|---|---|---|---|
| (part by weight) | | 10 | 11 | 12 | 13 | 14 | 15 |
| rubber | EPDM | — | — | 50 | 50 | — | 50 |
| | EPM | 100 | — | 50 | — | 50 | 30 |
| | silicone rubber | — | 100 | — | 50 | 50 | 20 |
| vulcanization | peroxide | 4.2 | 4.2 | 4.2 | 4.2 | 4.2 | 4.2 |
| filler | talc | 75 | 75 | 75 | 75 | 75 | 75 |
| carbon black | | 100 | 100 | 100 | 100 | 100 | 100 |
| paraffinic softener | | 60 | 60 | 60 | 60 | 60 | 60 |
| dry physical | TB (MPa) | 10.6 | 10.2 | 11.6 | 11.6 | 10.3 | 11.5 |
| property | EB (%) | 500 | 400 | 410 | 370 | 440 | 420 |
| | HA (point) | 69 | 71 | 70 | 71 | 70 | 70 |
| volume resistivity ($\Omega \cdot$ cm) | | $1 \times 10^{11}$ | $7 \times 10^{14}$ | $2 \times 10^{11}$ | $4 \times 10^{13}$ | $4 \times 10^{12}$ | $2 \times 10^{12}$ |
| surface resistivity ($\Omega$) | | $9 \times 10^{12}$ | $3 \times 10^{16}$ | $9 \times 10^{12}$ | $1 \times 10^{15}$ | $9 \times 10^{13}$ | $2 \times 10^{14}$ |
| alternating electrical resistance ($\Omega \cdot$ cm) | | $6 \times 10^{10}$ | $1 \times 10^{14}$ | $7 \times 10^{10}$ | $7 \times 10^{12}$ | $8 \times 10^{11}$ | $8 \times 10^{11}$ |
| electrical conductivity ($\mu$S/cm) | | 14.4 | 19.2 | 14.5 | 17.8 | 17.1 | 16.4 |
| metal ion concentration (ppm) | | 0.34 | 0.48 | 0.35 | 0.43 | 0.40 | 0.39 |
| Overall Evaluation | | ○ | ○ | ○ | ○ | ○ | ○ |

TABLE 4

| Mixing Amounts | | Comparative Examples | | | | |
|---|---|---|---|---|---|---|
| (part by weight) | | 1 | 2 | 3 | 4 | 5 |
| rubber | EPDM | 100 | 100 | — | — | — |
| | NBR | — | — | 100 | — | — |
| | CR | — | — | — | 100 | — |
| | CPE | — | — | — | — | 100 |
| vulcanization | peroxide | — | 4.2 | — | — | 5 |
| | zinc oxide | — | — | 5 | 5 | — |
| | magnesium oxide | — | — | — | 4 | — |
| | accelerator 22 | — | — | — | 1 | — |
| | accelerator TT | 4 | — | 2 | — | — |
| | epoxy resin | — | — | — | — | 5 |
| | sulfur | 1 | — | 1 | — | — |
| filler | talc | 75 | — | — | — | — |
| carbon black | | 100 | 100 | 60 | 60 | 70 |
| paraffinic softener | | 60 | 60 | — | — | — |
| phthalate softener | | — | — | 10 | 10 | 20 |
| dry physical | TB (MPa) | 12.8 | 14.9 | 20.8 | 21.4 | 20.6 |
| property | EB (%) | 410 | 410 | 440 | 300 | 360 |
| | HA (point) | 70 | 63 | 70 | 66 | 70 |
| volume resistivity ($\Omega \cdot$ cm) | | $6 \times 10^{9}$ | $8 \times 10^{4}$ | $4 \times 10^{8}$ | $5 \times 10^{7}$ | $8 \times 10^{9}$ |
| surface resistivity ($\Omega$) | | $5 \times 10^{11}$ | $1 \times 10^{7}$ | $1 \times 10^{10}$ | $2 \times 10^{9}$ | $5 \times 10^{11}$ |
| alternating electrical resistance ($\Omega \cdot$ cm) | | $3 \times 10^{9}$ | $1 \times 10^{5}$ | $9 \times 10^{7}$ | $9 \times 10^{6}$ | $3 \times 10^{9}$ |
| electrical conductivity ($\mu$S/cm) | | 820 | 9.2 | 770 | 630 | 470 |
| metal ion concentration (ppm) | | 480 | 0.21 | 370 | 340 | 270 |
| Overall Evaluation | | x | x | x | x | x |

As described above, the low-contaminative hose of the present invention is formed from the rubber composition that includes, as essential components, at least one rubber selected from an ethylene-propylene-diene terpolymer, an ethylene-propylene copolymer and a silicone rubber, a peroxide vulcanizing agent, and a filler having a laminar crystal structure. Therefore, the low-contaminative hose is less likely to extract ions into a fluid to be passed through so as to effectively prevent fluid contamination caused by ions and the like.

In particular, when the peroxide vulcanizing agent is within 1 to 10 parts and the filler is within 20 to 130 parts, respectively, per 100 parts of the selected rubber in the low-contaminative hose, such a hose can be extracted using pure water as a solvent such that the solvent reveals an electrical conductivity of 20 $\mu$S/cm or less, the solvent has a metal ion concentration of 0.5 ppm or less, and a volume resistivity of $10^7$ $\Omega\cdot$cm or more, a surface resistivity of $10^8$ $\Omega$ or more, and an alternating electrical resistance (impedance) of $10^4$ $\Omega\cdot$cm or more on flow of an alternating electric current of $10^4$ Hz. Therefore, the low-contaminative hose can yield excellent performance when it is used as a transport pipe for the above fuel cell, a cooling liquid-transport pipe for a super computer, a membrane cleaning liquid-transport pipe for an analytical instrument, and a chip or wafer cleaning liquid-transport pipe for semiconductor production.

What is claimed is:

1. A low-contaminative hose comprising: as essential components:
   (A) rubber consisting of at least one rubber selected from the group consisting of an ethylene-propylene-nonconjugated diene terpolymer, an ethylene-propylene copolymer and a silicone rubber;
   (B) a peroxide vulcanizing agent; and
   (C) at least one filler having a laminar crystal structure selected from the group consisting of clay, talc, kaolinite, hydrotalcite and mica.

2. A low-contaminative hose according to claim 1, wherein component B is contained in an amount of 1 to 10 parts by weight, and component C is contained in an amount of 20 to 130 parts by weight, respectively, based on 100 parts by weight of component A.

3. A low-contaminative hose according to claim 2, wherein when the hose is extracted using pure water as a solvent, the electrical conductivity of the solvent is 20 $\mu$S/cm or less.

4. A low-contaminative hose according to claim 2, wherein when the hose is extracted using pure water as a solvent, the metal ion concentration in the solvent is 0.5 ppm or less.

5. A low-contaminative hose according to claim 2, which has a volume resistivity of $10^7\cdot\Omega$cm or more, 6. A low-contaminate hose according to claim 2, which has a surface resistivity of $10^8\Omega$ or more.

7. A low-contaminate hose according to claim 2, which has an alternating electrical resistance (impedance) of $10^4\Omega\cdot$cm or more on flow of an alternating electric current of $10^4$ Hz.

8. A rubber composition for use in producing a low-contaminative hose, comprising: as essential components:
   (A) rubber consisting of at least one rubber selected from the group consisting of an ethylene-propylene-nonconjugated diene terpolymer, an ethylene-propylene copolymer and a silicone rubber;
   (B) a peroxide vulcanizing agent; and
   (C) at least one filler having a laminar crystal structure selected from the group consisting of clay, talc, kaolinite, hydrotalcite and mica.

9. A rubber composition according to claim 8, wherein component B is contained in an amount of 1 to 10 parts by weight, and component C is contained in an amount of 20 to 130 parts by weight, respectively, based on 100 parts by weight of compound A.

* * * * *